US008060873B2

(12) United States Patent
Ceskutti et al.

(10) Patent No.: US 8,060,873 B2
(45) Date of Patent: Nov. 15, 2011

(54) METHOD AND SYSTEM FOR REMOTE PROGRAMMING OF A PROGRAM-CONTROLLED DEVICE USING A LEGITIMIZATION CODE

(75) Inventors: Holger Ceskutti, Moeckmuehl (DE); Thomas Sonnenrein, Bockenem (DE); Gerrit De Boer, Hildesheim (DE); Norbert Bauer, Bad Neustadt (DE); Peter Engel, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1418 days.

(21) Appl. No.: 10/564,208

(22) PCT Filed: Jul. 8, 2004

(86) PCT No.: PCT/DE2004/001474
§ 371 (c)(1),
(2), (4) Date: May 31, 2006

(87) PCT Pub. No.: WO2005/008612
PCT Pub. Date: Jan. 27, 2005

(65) Prior Publication Data
US 2006/0220900 A1 Oct. 5, 2006

(30) Foreign Application Priority Data
Jul. 14, 2003 (DE) ................... 103 31 874

(51) Int. Cl.
*G06F 9/445* (2006.01)
*H04M 3/00* (2006.01)
*G05D 1/00* (2006.01)

(52) U.S. Cl. ............ 717/177; 455/418; 455/419; 701/1; 701/2; 717/174

(58) Field of Classification Search .......... 717/168–178; 340/988; 455/418, 419; 701/1, 2
See application file for complete search history.

(56) References Cited

U.S. PATENT DOCUMENTS

| | | | | |
|---|---|---|---|---|
| 5,649,187 A * | 7/1997 | Hornbuckle | ............... | 707/10 |
| 6,028,537 A * | 2/2000 | Suman et al. | ............... | 340/988 |
| 6,272,402 B1 * | 8/2001 | Kelwaski | ............... | 701/1 |
| 6,385,723 B1 | 5/2002 | Richards | | |
| 6,604,038 B1 * | 8/2003 | Lesesky et al. | ............... | 701/49 |
| 6,728,603 B2 * | 4/2004 | Pruzan et al. | ............... | 701/1 |
| 6,859,718 B2 * | 2/2005 | Fritz et al. | ............... | 701/100 |
| 7,010,289 B2 * | 3/2006 | Jijina et al. | ............... | 455/412.1 |
| 7,093,244 B2 * | 8/2006 | Lajoie et al. | ............... | 717/168 |
| 7,155,321 B2 * | 12/2006 | Bromley et al. | ............... | 701/29 |
| 7,243,238 B2 | 7/2007 | Watanabe et al. | | |

(Continued)

FOREIGN PATENT DOCUMENTS
DE 100 01 130 7/2000

(Continued)

*Primary Examiner* — Wei Zhen
*Assistant Examiner* — Qing Chen
(74) *Attorney, Agent, or Firm* — Kenyon & Kenyon LLP

(57) ABSTRACT

A method for remote programming of a program-controlled device, and a system having an interface to receive program data and a legitimization, as well as a remotely programmable, program-controlled device, which includes a processor and a program memory, are provided. In the method, program data are remotely transmitted from a control station to the interface and buffer-stored there in a buffer store. Subsequently, a legitimization is transmitted from the control station to the interface, and from there to the program-controlled device. The device checks the legitimization and imports the program data from the buffer store if the legitimization check is positive.

18 Claims, 3 Drawing Sheets

U.S. PATENT DOCUMENTS

| | | |
|---|---|---|
| 7,269,482 B1 * | 9/2007 | Shultz et al. ............... 701/1 |
| 7,366,589 B2 * | 4/2008 | Habermas .................. 701/1 |
| 2002/0019877 A1 | 2/2002 | Wrede |
| 2002/0035429 A1 | 3/2002 | Banas |
| 2002/0129043 A1 * | 9/2002 | Nakada et al. ............ 707/200 |
| 2004/0015952 A1 * | 1/2004 | Lajoie et al. ............. 717/171 |
| 2004/0054444 A1 * | 3/2004 | Abeska et al. ............. 701/1 |

FOREIGN PATENT DOCUMENTS

| | | |
|---|---|---|
| DE | 10131395 | 1/2003 |
| EP | 1128265 | 8/2001 |
| EP | 1324197 | 7/2003 |
| JP | 2000-172648 | 6/2000 |
| JP | 2001-525957 | 12/2001 |
| JP | 2002-77147 | 3/2002 |
| JP | 2002333989 | 11/2002 |
| JP | 2003-122588 | 4/2003 |
| WO | WO 2005/008612 | 1/2005 |

* cited by examiner

METHOD AND SYSTEM FOR REMOTE PROGRAMMING OF A PROGRAM-CONTROLLED DEVICE USING A LEGITIMIZATION CODE

FIELD OF THE INVENTION

The present invention relates to a method for remote programming of a program-controlled device, and to a system having an interface to receive program data and a legitimization, as well as to a remotely programmable, program-controlled device, which includes a processor and a program memory.

BACKGROUND INFORMATION

Modern vehicles increasingly use electronic control units to control and regulate a wide variety of vehicle functions. In particular, the operation of vehicle engines is controlled by means of such control units. Electronic control units require an EDP program to execute their functions. Often, this EDP program must be modified retroactively because program faults are discovered or else predefined values for operating parameters of a device controlled by the control unit need to be updated, or because functions of the EDP program are expanded or restricted. For this purpose, the control unit has an interface, so that corresponding modifications of the EDP program are able to be input into the control unit and stored there in a program memory. However, the vehicle must visit a service facility for this purpose, where the new program data are imported into the control unit using a so-called service facility tester. Since the program is usually of a confidential nature and, in addition, any unauthorized manipulation of the control unit's method of operation must be prevented, e.g., for reasons of liability and/or operating safety of the vehicle, the transmission of the program data is implemented with the aid of encoding mechanisms or codes specified by the vehicle manufacturer. The manufacturer stores the confidential codes in the service facility tester, which uses them prior to the reprogramming of the control unit as its legitimization (i.e., security code) vis-à-vis the control unit. This protects the control unit from direct manipulation, so that it is impossible to obtain, via unauthorized access to the control unit, its identification algorithms for the legitimization and to derive the legitimization therefrom. In order to avoid a complicated and time-consuming visit to a service facility, it is expedient to have the ability of programming the control unit remotely without, however, jeopardizing the access security in the process.

Published German patent document DE 100 01 130 describes a system and a method for the remote programming of a control unit, which controls a vehicle and is able to be programmed remotely. An interface for receiving program data from a remote control station via a wireless long-distance connection is part of the system. Program data to be transmitted to the control unit of the vehicle are buffer-stored in a buffer store at the interface and then transmitted into a program memory of the control unit. The buffering of the program data is necessary due to the often unstable wireless long-distance connection in which malfunctions such as a faulty data transmission or interruptions in the connection are quite common. Only when the program data have been received in their entirety are they able to be input into the memory of the control unit since the operation of the vehicle is interrupted while the program data are input into the memory of the control unit. If the program data were directly input into the memory of the control unit, without buffering, the operation of the vehicle would be interrupted during the entire time required for the remote transmission of the program data from the control station into the buffer store, which sometimes may take a relatively long time due to interruptions in the remote transmission.

However, a problem arises here with respect to the legitimization that must be transmitted to the control unit in order for it to accept the program data transmitted thereto from the buffer store. The manufacturer does not wish this legitimization to be physically and permanently stored in the vehicle itself, since the manufacturer thus loses control over the confidentiality or the dissemination of the legitimization.

SUMMARY

The present invention provides methods for remote programming of a program-controlled device, as well as a system for implementing such methods, which allow reprogramming of the program-controlled device with the shortest possible interruption of its normal operation and without jeopardizing the confidentiality of a legitimization.

In one example implementation of the method of the present invention, an uncontrolled dissemination of the secret legitimization (i.e., security code) is prevented in that the legitimization remotely transmitted from the control station to the interface is not buffered by the interface like the program data, but is immediately transmitted to the device where it is checked for its validity. Physical storing of the legitimization at the interface, as it happens with the program data, or storing in another location is not required for the functioning of the method. Thus, the legitimization is never present between interface and device in a way that would allow unauthorized access to the legitimization.

In one example implementation of the method of the present invention, the legitimization is indeed buffer-stored at the interface like the program data, but its validity is restricted in terms of time. The validity period should be selected to be so short that it will expire in an unauthorized accessing of the legitimization, even before an unauthorized programming of the device is able to be implemented with the aid of the legitimization.

In an advantageous manner, the legitimization and/or the program data are/is wirelessly transmitted via the long-distance connection. This generally allows the device unrestricted mobility. In order to minimize the effects of interference, which often occurs during the wireless transmission, the method will be repeated in the case of interference, so that a fault-free transmission of the program data is ensured.

From the interface, the program data and/or the legitimization are/is transmitted via a wireless connection from the interface to the device. A wired connection between interface and device may be useful when, for example, interface and device are both situated in a mobile device such as a motor vehicle or robot.

Prior to transmission of the program data from the control station to the interface, it is possible to read out second data from a memory of the device, for instance the program memory, and to transmit these data to the control station. In this manner, the control station is informed about an instantaneous state of the data available in the device. On the basis of this instantaneous state of the second data the control station is then able to arrange the new program data accordingly. For instance, values of operating parameters or program components that are to remain unchanged need not be transmitted from the control station to the interface together with the program data. A data quantity of program data to be transmitted may thus be reduced, which accelerates the remote transmission of the program data and thereby decreases the susceptibility to failure of the remote transmission. Prior to the remote transmission to the control station, the second data are advantageously buffered at the interface. The buffering makes it possible to first collect the second data to be transmitted at the interface with the lowest priority, i.e., without detrimental effect on tasks to be executed simultaneously by the device for its normal operation, and then to transmit these data within a short time in a continuous manner. In this way, the time span during which normal operation of the device must be interrupted (since no valid program is available to control this operation), is kept to a minimum.

It is advantageous to check the success of the remote programming after acceptance of the program data in the buffer store and to initiate an operation of the device controlled by the program data only if the result of the check was positive. Faulty program data are thereby detected in a timely manner and may be corrected before they are able to cause faulty operation of the device having remote programmability.

The program memory of the program-controlled device, having remote programmability, according to the present invention may be any type of permanent memory having electrical overwrite capability, e.g., an EEPROM or a flash memory. Due to the fact that flash memories are always able to be overwritten only in their entirety, when using such a memory in the afore-discussed case, where parts of the program data stored therein are to remain unchanged in a reprogramming and thus are not transmitted from the control station to the interface, these parts will be transmitted from the flash memory into the buffer of the interface and afterwards written back into the flash memory together with the new program data.

In the system according to the present invention the interface is connectable to a control station with the aid of a wireless long-distance connection. The wireless long-distance connection may be, for instance, a cellular mobile radio connection. In the process, the device having remote programming capability receives at the interface from the control station the program data and the legitimization, the legitimization possibly being valid for a limited period of time. The interface forwards the legitimization either immediately and unbuffered to the flash memory or, given limited validity of the legitimization, the interface buffers it like the program data in a buffer store prior to forwarding the legitimization to the flash memory. This prevents an unauthorized party from gaining access to the legitimization at some point in the system and using it at a later time in order to manipulate the program data.

The device may be a control unit that controls a subsidiary device. The subsidiary device may be, for instance, an engine or some other component of a motor vehicle.

In an advantageous manner, the system is situated in a motor vehicle.

DETAILED DESCRIPTION

Figure 1:
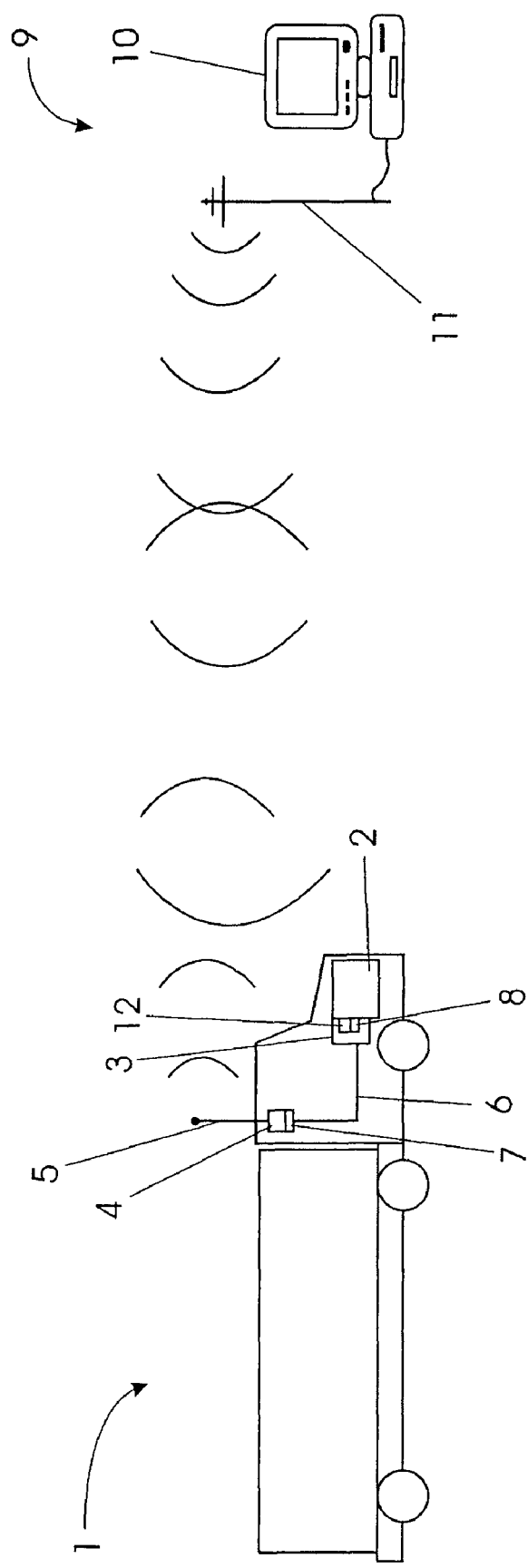
FIG. 1 shows a schematic illustration of a device having remote programmability.

FIG. 1 schematically illustrates a device 1 having remote programmability, which is a vehicle. Vehicle 1 includes an engine 2, a control unit 3, an interface 4, an antenna 5, as well as a wired connection 6 between control unit 3 and interface 4. Interface 4 has a buffer store 7, while control unit 3 has a flash memory 8 and a processor 12. Via antenna 5, vehicle 1 is connectable to a control station 9 in a wireless manner. Control station 9 has a computer 10 and an antenna 11. Computer 10 may be stationary computer such as a personal computer, or else a mobile device, such as a laptop.

During operation of vehicle 1, its engine 2 is controlled by control unit 3. To this end, EDP programs for the control, and also predefined values for operating parameters of engine 2, are stored in flash memory 8 of control unit 3. These EDP programs and operating parameters must be modified periodically. This is done via control station 9. Using antennas 5, 11, a wireless connection is established between vehicle 1 and control station 9 for this purpose. Using this wireless connection, new program data are transmitted from control station 9 to vehicle 1 and buffer-stored in buffer store 7 of interface 4. Subsequently, control station 9 transmits a legitimization (security code) to interface 4 and from there to control unit 3. After the legitimization has been checked with a positive result by processor 12 of control unit 3, flash memory 8 imports the program data buffer-stored in buffer store 7. Vehicle 1 is not in operation during this brief period of time. Two example implementations of the method, which will be explained in greater detail in the following with the aid of an individual flow chart, are provided for the remote programming of flash memory 8.

Figure 2:
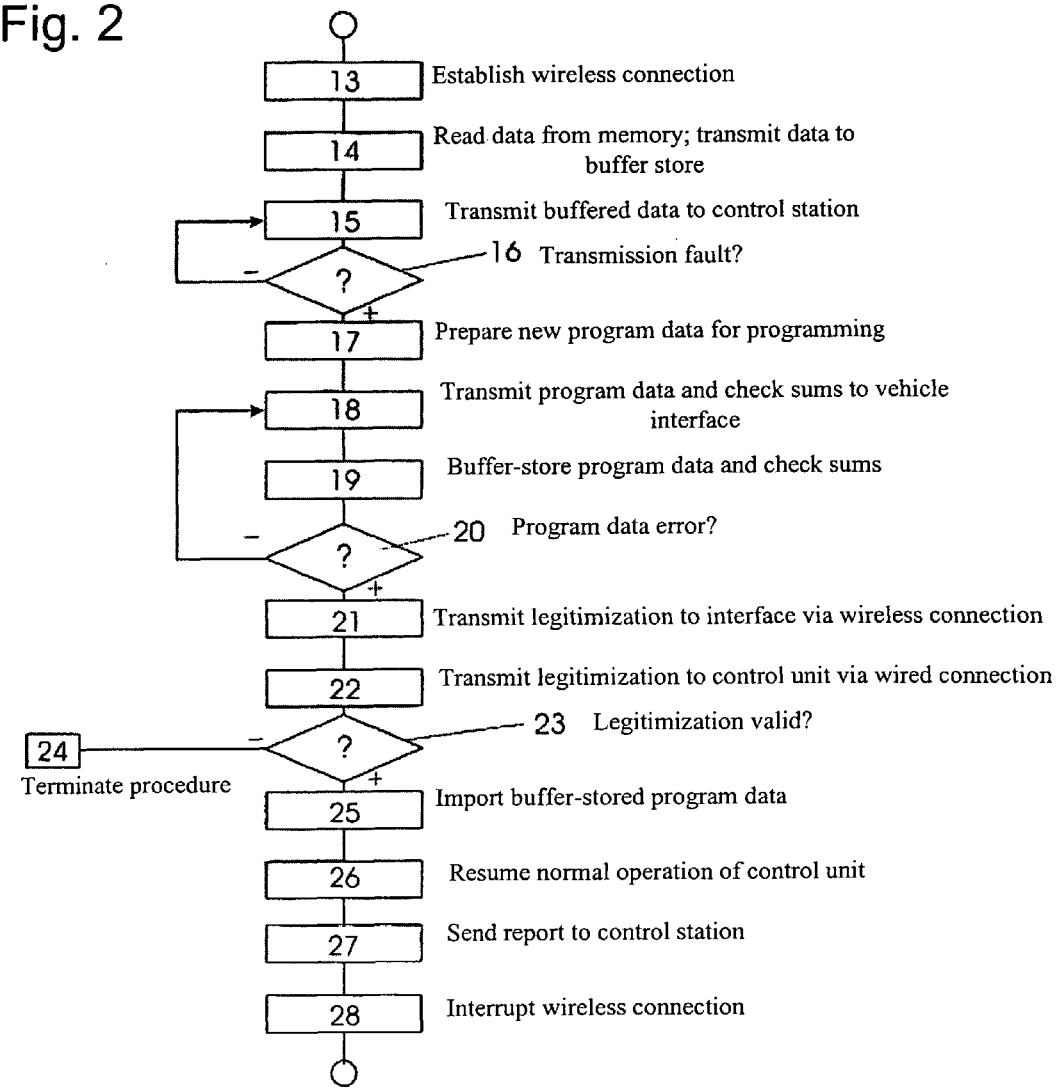
FIG. 2 shows a flow chart of a first example method according to the present invention.

FIG. 2 shows a flow chart of the first example implementation of the method according to the present invention. First of all, in a first step 13, a wireless connection is established between control station 9 and vehicle 1 via antennas 5, 11. Once the connection has been established, data are read out from flash memory 8 in step 14 and transmitted via connection 6 to buffer store 7 where they are buffered. In the following step 15, these data of buffer store 7 are remotely transmitted via interface 4 and the wireless connection between antennas 5, 11, from vehicle 1 to control station 9. In addition to the actual program data, the data include one or more check sums calculated from the program data, on the basis of which the success of this remote transmission is checked by computer 10 of control station 9 in step 16.

If faults have occurred during the remote transmission of the data, for instance because the remote transmission was interrupted or was implemented in a faulty manner, steps 15 and 16 are repeated. If the remote transmission was successful, in step 17, control station 9 together with computer 10 prepares new program data to be programmed into flash memory 8 on the basis of the received data. In particular, computer 10 checks which operating parameters must be changed or whether the EDP program of flash memory 8 must be expanded or corrected.

After the new program data have been set up, the program data and the check sums calculated therefrom are transmitted in step 18 from control station 9 to interface 4 of vehicle 1 via the wireless connection between antennas 5, 11. In step 19, the program data and checks sums are buffer-stored there in buffer store 7.

In step 20, interface 4 checks the integrity of the transmitted program data with the aid of the check sums. If it determines an error in the program data, it returns to step 18 in order to initiate a new transmission.

As soon as the program data in buffer store 7 have been judged to be free of errors, control station 9 in step 21 transmits a legitimization to interface 4 via the wireless connection of antennas 5, 11. In step 22, the legitimization is immediately transmitted from interface 4 to control unit 3, without buffering, via wired connection 6. After receipt of the legitimization, processor 12 of control unit 3 checks the legitimization as to its validity in step 23. Nowhere is the legitimization stored any longer than necessary for processor 12 to make a decision regarding its validity. This prevents uncontrolled access to the legitimization.

If the legitimization turns out to be invalid in step 23, this will result in termination 24 of the procedure. If the validity of the legitimization has been established, flash memory 8 in step 25 imports the program data buffer-stored in buffer store 7.

In step 26, normal operation of control unit 3 is resumed on the basis of the updated program now stored in flash memory 8, in this way reestablishing normal operation of vehicle 1. In step 27, a corresponding report is made to control station 9. In step 28, the wireless connection between vehicle 1 and control station 9 is then interrupted and the operation terminated.

Figure 3:
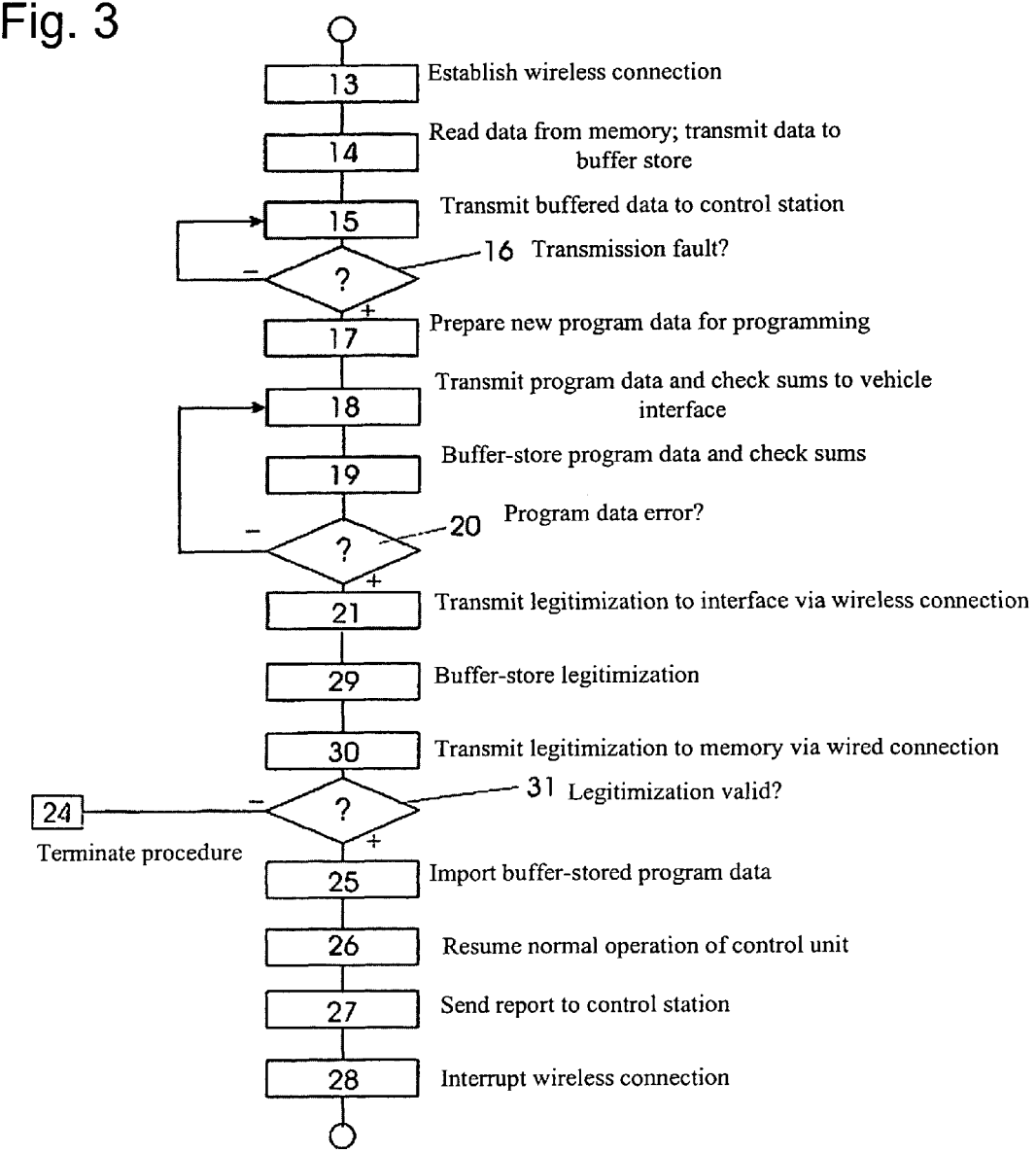
FIG. 3 shows a flow chart of a second example method according to the present invention.

Another example implementation of the method according to the present invention for the remote programming of flash memory 8 can be gathered from the flow chart of FIG. 3. This method is initiated by the same steps 13 through 21 as in method described previously, so that for the description of method steps 13 through 21 in FIG. 3 reference is made to the corresponding description of method steps 13 through 21 in FIG. 2. After transmission of the legitimization from control station 9 to interface 7 in step 21, the second example implementation of the method according to FIG. 3 deviates from the first example implementation of the method in following step 29, in that the legitimization is buffer-stored in buffer store 7 in step 29. That is to say, interface 4 need not be able to differentiate between program data and legitimization; as a result, it may have a simpler design as in the case of FIG. 2. In contrast to the implementation of the method of FIG. 2, the implementation of the method of FIG. 3 involves a legitimization having a validity that is restricted in time. This means that processor 12 of control unit 3 accepts the legitimization as valid only within a specific predefined time interval. For this reason the physical buffer-storing of the legitimization in buffer store 7 also is not considered a serious risk to the safety against manipulations; if an unauthorized party manages to discover the legitimization, its attempt at manipulation will be unsuccessful nevertheless, since processor 12 will no longer accept as valid the legitimization that has expired in the meantime.

In step 30, the legitimization is transmitted from interface 4 to memory unit 3, and in step 31 it is checked by processor 12 as to its validity. As mentioned, this validity check also includes a check with respect to a temporal validity of the legitimization. If there is a negative decision regarding the legitimization's validity, or if the legitimization is considered temporally invalid, the procedure is terminated in step 24. If the legitimization is accepted as valid, the method continues with steps 25 through 28, which correspond to steps 25 through 28 in the flow chart of FIG. 2 and for whose description reference is made here once again to the description in connection with FIG. 2.

The above-discussed implementations are example implementations of the method according to the present invention. In addition, variations of the implementations of the method are possible as well without departing from the inventive idea. In the second implementation of the method according to FIG. 3, for instance, step 21 of transmitting the legitimization may be implemented prior to steps 18 through 20 of transmitting the program data, so that subsequently, when all received data are transmitted by the interface to the device in the sequence in which they were received, the legitimization will arrive first and is able to be checked by processor 12.

Additional protection may be achieved if, between step 25 of importation of the program data by the device, and step 26 of resumption of normal operation, processor 12 implements a check of check sums transmitted to the device together with the program data and step 25 is repeated if an error is detected.

It is also possible to assign a separate legitimization to interface 4, which must be transmitted to the device in each reprogramming of the device in the same way the legitimization of the control station must be transmitted to the device before the device allows reprogramming.

What is claimed is:

1. A method for remote programming of a device configured to be program-controlled, comprising:
   remotely transmitting program data from a control station via a long-distance connection to an interface connected to the device, wherein the program data include one or more check sums calculated from the program data;
   buffering the program data at the interface;
   checking the integrity of the program data by using the one or more check sums;
   if the program data is determined to be free of errors, remotely transmitting a legitimization from the control station to the interface, wherein the legitimization forms a security code associated with the device;
   assigning a validity period to the legitimization;
   forwarding the legitimization, unbuffered, to the device upon receiving the legitimization at the interface;
   checking, by the device, the legitimization for validity, wherein the checking includes checking of the validity period of the legitimization; and
   if the legitimization is determined to be valid, entering the program data into a memory of the device.

2. The method as recited in claim 1, wherein at least one of the legitimization and the program data is wirelessly transmitted via the long-distance connection.

3. The method as recited in claim 2, wherein the method is repeated if a fault occurs in the wireless transmission of at least one of the legitimization and the program data.

4. The method as recited in claim 3, wherein at least one of the program data and the legitimization is forwarded via a wired connection from the interface to the device.

5. The method as recited in claim 4, further comprising:
   prior to the remote transmission of the program data to the interface, reading data from the memory of the device and transmitting the device memory data to the control station.

6. The method as recited claim 4, further comprising:
   after entering of the program data into the memory of the device, checking whether the remote programming has been successfully completed, and
   if the remote programming has been successfully completed, resuming an operation of the device, controlled by the program data.

7. A method for remote programming of a device configured to be program-controlled, comprising:
   remotely transmitting program data from a control station via a long-distance connection to an interface connected to the device, wherein the program data include one or more check sums calculated from the program data;
   buffering the program data at the interface;
   checking the integrity of the program data by using the one or more check sums;
   if the program data is determined to be free of errors, remotely transmitting a legitimization from the control station to the interface, wherein the legitimization forms a security code associated with the device;
   buffering the legitimization at the interface by storing the legitimization together with the program data;
   assigning a validity period to the legitimization;

after the buffering of the legitimization, forwarding the legitimization to the device;

checking, by the device, the legitimization for validity, wherein the checking includes checking of the validity period of the legitimization; and if the legitimization is determined to be valid, entering the program data into a memory of the device.

8. The method as recited in claim 7, wherein at least one of the legitimization and the program data is wirelessly transmitted via the long-distance connection.

9. The method as recited in claim 8, wherein the method is repeated if a fault occurs in the wireless transmission of at least one of the legitimization and the program data.

10. The method as recited in claim 9, wherein at least one of the program data and the legitimization is forwarded via a wired connection from the interface to the device.

11. The method as recited in claim 10, further comprising:
prior to the remote transmission of the program data to the interface, reading data from the memory of the device and transmitting the device memory data to the control station.

12. The method as recited in claim 11, wherein the device memory data are buffered at the interface prior to being transmitted to the control station.

13. The method as recited in claim 11, wherein the control station arranges the program data on the basis of the device memory data.

14. A system for remote programming of a device, comprising:
an interface configured to receive program data and a legitimization from a control station, wherein the program data include one or more check sums calculated from the program data; and
the device is configured to be remotely programmed and program-controlled, wherein the device includes a processor and a program memory, wherein the device is operatively connected to the interface, wherein the legitimization forms a security code associated with the device, wherein the legitimization is assigned a validity period, and wherein the device is further configured to check the validity period of the legitimization;
wherein the interface is further configured to:
buffer the received program data;
check the integrity of the received program data by using the one or more check sums;
receive the legitimization from the control station if the received program data is determined to be free of errors;
forward the received legitimization to the device without buffering, upon receiving the legitimization; and
transmit the buffered program data to the device after a positive determination of validity of the received legitimization by the device.

15. The system as recited in claim 14, wherein the program memory is one of a flash memory and an EEPROM.

16. The system as recited in claim 14, wherein the interface is operatively connected to a control station with the aid of a wireless long-distance connection.

17. The system as recited in claim 16, wherein the device is a control unit that controls a subsidiary device.

18. The system as recited in claim 17, wherein the subsidiary device is one of: a motor vehicle; a component of the motor vehicle; and an engine.

* * * * *